United States Patent [19]

Sharangpani

[11] Patent Number: 5,522,051
[45] Date of Patent: May 28, 1996

[54] METHOD AND APPARATUS FOR STACK MANIPULATION IN A PIPELINED PROCESSOR

[75] Inventor: Harshvardhan P. Sharangpani, Santa Clara, Calif.

[73] Assignee: Intel Corporation, Santa Clara, Calif.

[21] Appl. No.: 306,252

[22] Filed: Sep. 14, 1994

Related U.S. Application Data

[63] Continuation of Ser. No. 922,021, Jul. 29, 1992, abandoned.
[51] Int. Cl.[6] .............................. G06F 12/02; G06F 9/35
[52] U.S. Cl. ...................... 395/375; 395/400; 364/247.7; 364/254.5; 364/231.8; 364/DIG. 1; 364/957.6; 364/964.26
[58] Field of Search ................................ 395/375, 800, 395/400

[56] References Cited

U.S. PATENT DOCUMENTS

| | | | |
|---|---|---|---|
| 4,853,849 | 8/1989 | Bain, Jr. et al. ...................... | 395/400 |
| 4,907,147 | 3/1990 | Saito et al. ............................. | 395/375 |
| 4,974,158 | 11/1990 | Watanabe et al. ...................... | 395/375 |
| 5,201,056 | 4/1993 | Daniel et al. .......................... | 395/800 |
| 5,367,650 | 11/1994 | Sharangpani .......................... | 395/375 |

OTHER PUBLICATIONS

Yoshida, T. et al. *A strategy for avoiding pipeline interlock delays in a microprocessor* IEEE Computer Soc Press, Los Alamitor, CA 17–19 Sep. 1990.

*Primary Examiner*—Parshotam S. Lall
*Assistant Examiner*—Brian Ledell
*Attorney, Agent, or Firm*—Blakely, Sokoloff, Taylor & Zafman

[57] ABSTRACT

A method and apparatus for accessing and manipulating a stack register file during an instruction execution through a pipelined execution unit. A plurality of control directives are provided to the apparatus. A stack register file having a plurality of physical registers is provided for storing data. The physical register file has a stack organization. A pointer table register file having a plurality of pointer table registers stores physical register addresses. A TAG register file comprising a plurality of TAG registers, one for each of the pointer table register, is provided for signalling whether the associated physical register is empty or full. A TOS address generator generates an address of one of the pointer table registers which contains an address of one of the physical registers which is the current top of stack register. A pointer table address generator generates for each of the instruction operands, an address of one of the pointer table registers which contains the address of one of the physical registers which contains the operand. A TAG checking and setting generator reads the TAG register file and writes into the TAG register file.

30 Claims, 8 Drawing Sheets

| Opcode | | DST | SRC1 | SRC2 | | FTOS | | FSET | | FCHK | |
|---|---|---|---|---|---|---|---|---|---|---|---|

Figure 5a

| ADD | | St0 | St0 | St2 | | DEC1 | | Set St0 | | Check St0, St1 | |
|---|---|---|---|---|---|---|---|---|---|---|---|

FADD St0, St2

| Stack Position | Pointer Table File | Physical Register File | Programmer Stack |
|---|---|---|---|
| St7    PT0$_{(000)}$ | 000 (R0) → R0$_{(000)}$ | N/A | |
| TOS → PT1$_{(001)}$ | 001 (R1) → R1$_{(001)}$ | A | A    St0 |
| St1    PT2$_{(010)}$ | 010 (R2) → R2$_{(010)}$ | B | B    St1 |
| St2    PT3$_{(011)}$ | 011 (R3) → R3$_{(011)}$ | C | C    St2 |
| St3    PT4$_{(100)}$ | 100 (R4) → R4$_{(100)}$ | D | D    St3 |
| St4    PT5$_{(101)}$ | 101 (R5) → R5$_{(101)}$ | N/A | |
| St5    PT6$_{(110)}$ | 110 (R6) → R6$_{(110)}$ | N/A | |
| St6    PT7$_{(111)}$ | 111 (R7) → R7$_{(111)}$ | N/A | |

Figure 7b

| Stack Position | Pointer Table File | Physical Register File | Programmer Stack |
|---|---|---|---|
| St7    PT0$_{(000)}$ | 000 (R0) → R0$_{(000)}$ | N/A | |
| TOS → PT1$_{(001)}$ | 011 (R3) ⤫ R1$_{(001)}$ | ? | C    St0 |
| St1    PT2$_{(010)}$ | 010 (R2) → R2$_{(010)}$ | B | B    St1 |
| St2    PT3$_{(011)}$ | 001 (R1) ⤫ R3$_{(011)}$ | C | ?    St2 |
| St3    PT4$_{(100)}$ | 100 (R4) → R4$_{(100)}$ | D | D    St3 |
| St4    PT5$_{(101)}$ | 101 (R5) → R5$_{(101)}$ | N/A | |
| St5    PT6$_{(110)}$ | 110 (R6) → R6$_{(110)}$ | N/A | |
| St6    PT7$_{(111)}$ | 111 (R7) → R7$_{(111)}$ | N/A | |

Figure 7c

| Stack Position | Pointer Table File | Physical Register File | Programmer Stack |
|---|---|---|---|
| St6    PT0$_{(000)}$ | 000 (R0) → R0$_{(000)}$ | N/A | |
| St7    PT1$_{(001)}$ | 011 (R3) ⤫ R1$_{(001)}$ | X | |
| TOS → PT2$_{(010)}$ | 010 (R2) → R2$_{(010)}$ | B | B    St0 |
| St1    PT3$_{(011)}$ | 001 (R1) ⤫ R3$_{(011)}$ | N/A | X    St1 |
| St2    PT4$_{(100)}$ | 100 (R4) → R4$_{(100)}$ | D | D    St2 |
| St3    PT5$_{(101)}$ | 101 (R5) → R5$_{(101)}$ | N/A | |
| St4    PT6$_{(110)}$ | 110 (R6) → R6$_{(110)}$ | N/A | |
| St5    PT7$_{(111)}$ | 111 (R7) → R7$_{(111)}$ | N/A | |

METHOD AND APPARATUS FOR STACK MANIPULATION IN A PIPELINED PROCESSOR

This is a continuation of application Ser. No. 07/922,021, filed Jul. 29, 1992 now abandoned.

BACKGROUND OF THE INVENTION

1. Field of the Invention

The present invention relates to the field of microprocessor micro-architecture design and more specifically to a method and apparatus for manipulating in a pipelined processor a data register file having a stack organization.

2. Description of the Related Art

Many microprocessors today operate on data contained in a register file which has a stack organization. Microprocessors such as Intel's 8087, 80287, 80387, and i486 microprocessors have floating point units which store and access data contained in a register file which has a stack organization. Details of the x87 architecture may be found in *Microprocessors* published by Intel Corp. On the 80×87 architecture which has a stack organization for its registers, there are eight registers numbered 000 through 111. These registers are never addressed directly by the instruction opcode, but rather are addressed as a stack. At any time one register is referred to as the top of stack register or TOS register. The corresponding register number (address between 000 and 111) is stored in a 3-bit field called TOS (top of stack) in a 16-bit register called the Status Word register. An instruction always has its first source operand implicitly in the stack top. The address of the second operand is specified as a 3-bit value or index off the stack top, so that the actual register number has to be obtained by adding this 3-bit index to the register number at the stack top.

For example, a stack of data may look like the following:

| Stack 1 | | |
|---|---|---|
| | Data | Stack Position |
| TOS | A | ST0 |
| | B | ST1 |
| | C | ST2 |

In this example, data A is located at the top of stack. Data A is stored in a data register which is currently considered the top of stack register, or the ST0 register. The present ST0 register is specified by the TOS component of a Status Word register which contains the address or "points to" the data register which is the current top of stack register or ST0 register. Data B is stored in a data register which currently has its position one from the top of stack or the ST1 register. Data C is located in a register which currently has its position two from the top of stack or is in the ST2 register.

When new data is added to the stack, it is "pushed" onto the stack. For example, if X were "pushed" onto stack 1, the new stack would look like the following:

| Stack 2 | | |
|---|---|---|
| | Data | Stack Position |
| TOS | X | ST0 |
| | A | ST1 |
| | B | ST2 |

| Stack 2 (continued) | | |
|---|---|---|
| | Data | Stack Position |
| | C | ST3 |

Now data X is at the top of stack. Data X is stored into a data register which now becomes the top of stack register or the ST0 register. The TOS component of the Status Word register is updated with a new address to reflect the new top of stack register. Datas A, B and C each remain in their previously assigned data registers but each of the data registers is now a stack position lower. Datas A, B, and C are now said to be stored, respectively, in the ST1, ST2 and ST3 registers.

When data is removed from the stack register file to main memory, it is said to be "popped" off the stack. The data contained in the data register which is currently at the the top of stack position is removed from the stack and each of the data currently stored in lower stack positions move up a respective stack position. For example, if data A were "popped" from stack 1, the stack would look like the following:

| Stack 3 | | |
|---|---|---|
| | Data | Stack Position |
| TOS | B | ST0 |
| | C | ST1 |

The register which stores data B, is now considered the top of stack register, and the TOS component of the Status register is updated with its address to reflect the change. The register which contains data C is now one from the top of stack or is the ST1 register. It is important to note that all "pushes" and "pops" utilize the top of stack register.

Instructions operate on operands which are addressed by their relative position on the stack. Instructions address the stack either implicitly or explicitly. An instruction whose opcode provides an explicit register address is said to address that register explicitly. All instructions that have two operands address the stack top implicitly for one operand and explicitly address a register for the second operand.

For example, a simple add instruction may look like:

FADD ST0 ST2

This instruction implicitly addresses the stacktop and explicitly addresses the register second from the top of the stack. This instruction adds the contents of the register which is considered to be at the top of the stack, ST0, to the contents of the register which is second from the top of stack or the ST2 register. The result of the addition by definition is written into the ST0 register. Similarly, a store looks like:

FST

This instruction implicitly stores the data in the ST0 position into main memory. Instructions which provide no operand implicitly utilize the top of stack register.

Figure 1:
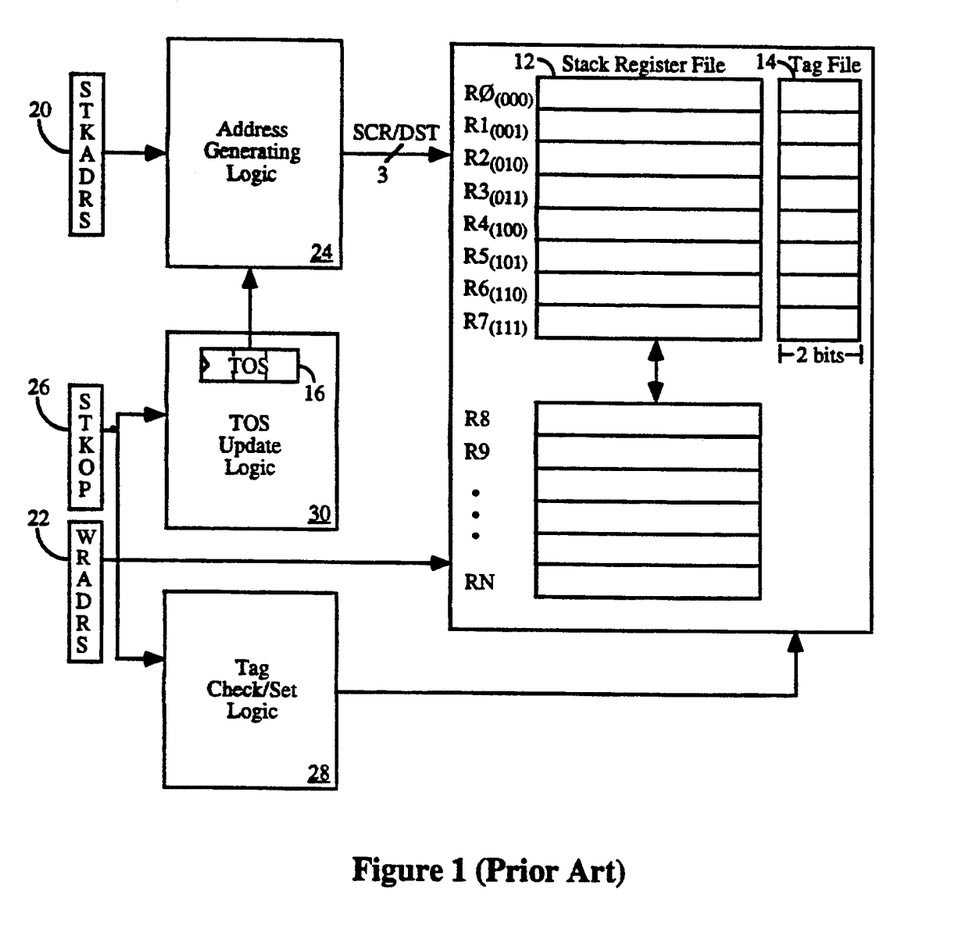
FIG. 1 is an illustration of a stack manipulation apparatus of the prior art.

Prior art microprocessors which access and store data in a register file having a stack organization have stack manipulation units as shown generally in FIG. 1. Provided is a data register file 12 consisting of eight registers (R0–R7) which are accessed by stack addressing. A 16-bit processor Tag Word 14 is provided and indicates if the associated register is full or empty, and if full, whether the operand is special (NAN, Infinite, etc.) or not. Working registers R8–RN 13 are also provided. A TOS component 16 of a Status Word register provides a 3-bit address of one of the eight data registers which is currently the top of stack register.

The typical instruction processing algorithm in the prior art entails first moving operands from the stack registers 12 into working registers $R_8$–$R_N$ 13, then operating entirely within the space of the execution hardware and working registers 13, and finally transferring results back to the destination stack register.

Figure 2A:
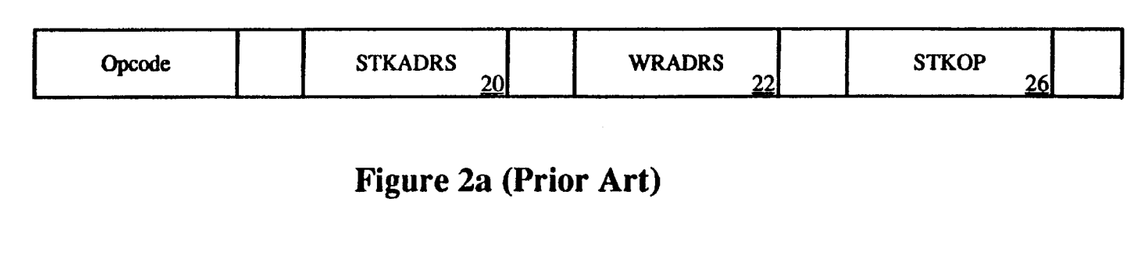
FIG. 2a is an illustration of the relevant stack manipulation fields of a μvector in the prior art.

Instructions are decoded into a stream of microcontrol vectors (or µvectors). Each µvector is divided into a plurality of microcontrol fields, each of which provides control directives for manipulating hardware of the microprocessor, As shown in FIG. 2a, in the prior art there are several fields, namely STKADRS, WRADRS, and STKOP, in each microvector which control the manipulation of the stack.

The STKADRS field 20 supplies an offset (000–111) to address generating logic 24. The offset is added to the TOS component 16 of the Status Word register to generate the physical register address (RØ–R7) of an instructions operand or the physical register address where the instruction's result (destination) is to be written. In the prior art, only a single register (either the source or the destination) can be addressed by each vector. That is, the STKADRS field in each µvector only provides directives for addressing one register.

The STKOP field 26 provides directives in each µvector for setting and checking of the TAG's of the 16-bit processor TAG word 14 which is associated with the register addressed by the STKADRS field of the present µvector. In the prior art, the STKOP field can only check or set the TAGs of a single register, the one presently addressed by the µvector. Additionally, the STKOP field 26 provides directives to the TOS update logic 30 for controlling the updating of the TOS component 16 of the Status Word register with the new address of the physical register which is currently the top of the stack register.

The WRADRS field 22 supplies a working register address to where the data of the addressed stack register is written. The working registers are used for the manipulation of data during the execution of an instruction. That is, instruction operands are written into specified working registers, executed on and the result later transferred to the destination registers in the stack register file.

There are two distinct disadvantages with the prior art method and apparatus for stack manipulation. First, in the prior art, instruction latency (time required to execute an instruction) is too large for modern processors because of limited hardware that has to be re-used, and because instructions have to be broken up into a plurality of µvectors in order to implement all of the required stack manipulation operations. And second, in the prior art stack manipulation a "top of stack bottleneck" develops if it is implemented in a microprocessor which has pipelined micro-architecture.

In the prior art stack manipulation apparatus, each instruction is broken up into several µvectors in order to implement all of the stack manipulation procedures. In the prior art there is only a single read/write port to the stack register file 12. The control circuitry and microcode organization is designed around this single port to the register file. That is, since only a single register can be read or written into at a time, each µvector addresses only one register. As such, in the prior art there is only one field, the STKADRS field 20, in each microvector for addressing a stack register. Similarly, the STKOP field 26 only controls the check/setting of one register at a time, the stack register addressed by the the STKADRS field.

Figure 2B:
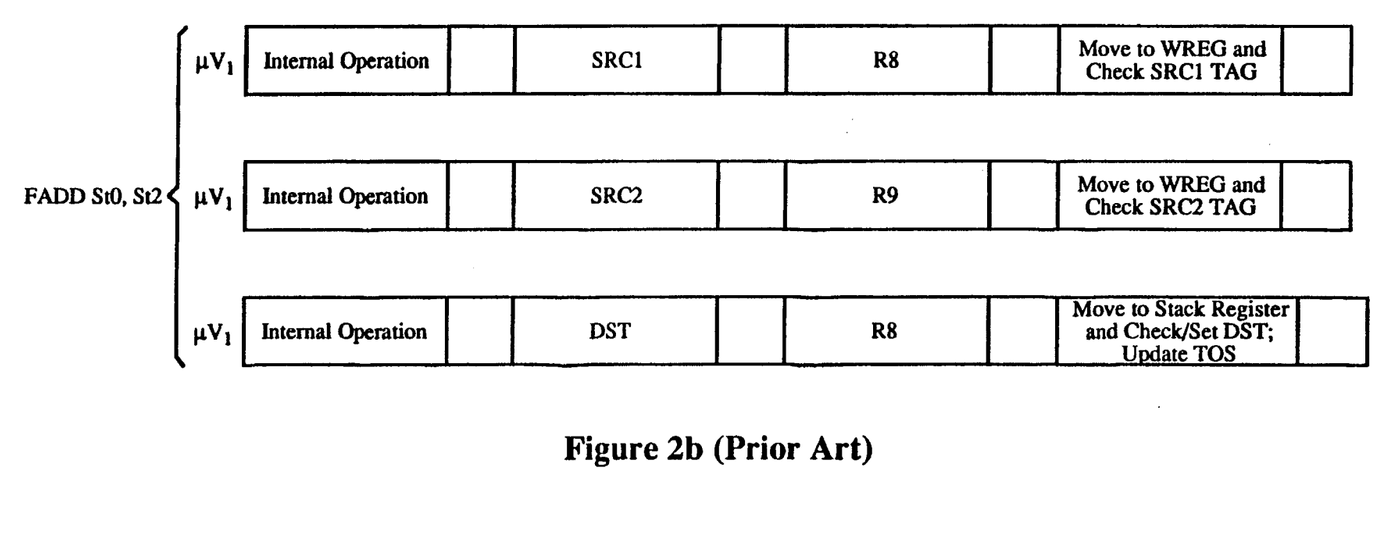
FIG. 2b is an illustration of a microcontrol vector stream of a single instruction in the prior art.

For example, as shown in FIG. 2b, a simple instruction such as FADD STØ, ST2 in the prior art requires at least three µvectors to implement all of the required stack manipulation procedures. The first $\mu V_1$ supplies in the STKADRS field 20 an offset of zero (000), to the address generating logic to generate the stack physical address of the first operand, STØ (i.e. zero is added to the TOS address to generate the STØ address). The STKOP field 26 in the same µvector, $\mu V_1$, supplies control directives to TAG check/set logic 28 to check the TAG of the first operand. A second µvector, $\mu V_2$, supplies in the STKADRS field 20 an offset 2 (010) which is added to the value in the TOS component of the Status Word 16 in the address generating logic 30 to generate the stack register address of the second operand, ST2. The second µvector $\mu V_2$ supplies in the STKOP field 26 control directives for checking the TAG of this addressed register to see whether or not the register contains valid data. And finally a third µvector, $\mu V_3$, provides in the STKADRS field an offset zero (000) which is used to generate the destination register address for the result of the add. The third µvector, $\mu V_3$, supplies in the single STKOP field directives for setting the addressed register at full, and for updating the TOS component of the Status Word.

Thus, in the prior art, the STKOP field can only check or set the TAGs of one register at a time, the register currently addressed by the STKADRS field. For every instruction in the prior art, at least one µvector is required for each operand/destination in order to implement the required stack manipulation procedures. Such large instruction latency is unacceptable in microprocessors where high execution speed is desired. Microprocessors which desire high speed instruction execution cannot use the prior art method of manipulating the stack. Thus, what is desired is a method and apparatus for manipulating with a single µvector the stack of a stack organized microprocessor with a single µvector, so that instruction latency can be dramatically decreased.

Another disadvantage with the prior art method of stack manipulation is the "top of stack bottleneck" which develops when the prior art scheme is utilized in a pipelined processing unit. In processors having a stack organization, the top of stack register (STØ) is the most heavily used register. This is because all single operand instructions operate upon the STØ register and replace it with a result. Two operand instructions always use the STØ register for one of the two operands while the second operand is accessed via an index added to the top of stack address. The result from two operand instruction are written back to either the STØ register or the other register. All loads from memory load into the STØ register. And still, all stores to memory read the operand from the STØ register. Thus, the STØ register sees the most traffic in a register file having a stack organization.

Thus, before any "single operand" operation can be performed on an operand, the operand must be brought to the stack top. Additionally, for any two operand instructions, one operand must be brought to the stack top. Likewise, before an operand in the register may be stored to memory it must also be brought to the stack top. A programmer, therefore, in the x87 architecture judiciously uses the FXCH instruction to deploy his operands where desired. The FXCH instruction exchanges data between the top of stack register and a second register.

For example, let's assume a programmer wishes to execute an ADD of the top two numbers in the stack, and after the ADD, the programmer wishes to store to memory the operand which is presently contained in the third level of the stack. A programmer would normally execute an FXCH ST∅, ST1 instruction between the two instructions to free up the top of stack register. This would generate an instruction stream which is:
   FADD ST∅, ST1
   FXCH ST∅, ST2
   FST The first instruction adds the contents of ST∅ to ST1 register and stores the result in the ST∅ register. The second instruction exchanges the contents of ST∅ register with the contents of ST2 register. In this way, the former content of the ST2 register is now available in the ST∅ register. The third instruction FST can then store the operand originally in the third stack position, to external memory.

Figure 3:
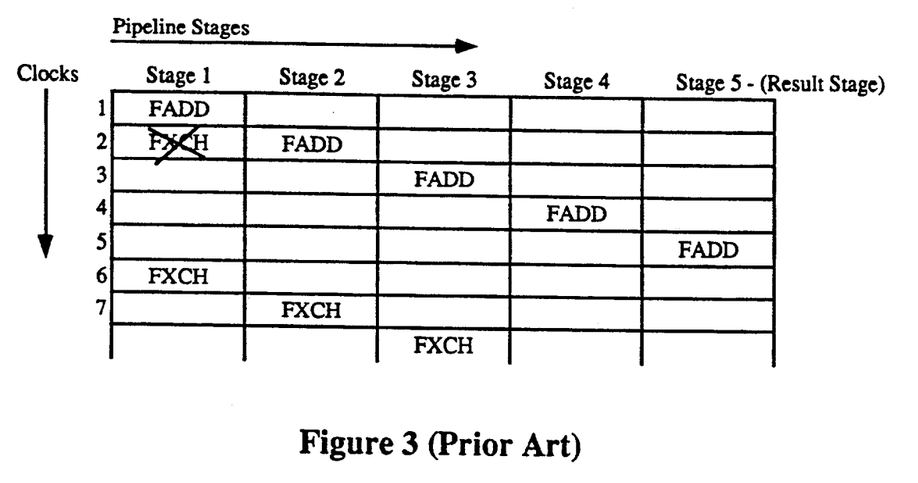
FIG. 3 is an illustration of a shortcoming of the prior art stack manipulation scheme implemented in pipelined processor.

In order to increase instruction throughput modern processors have pipelined execution units. In a pipelined processor, as shown in FIG. 3, the execution of an instruction is distributed into a plurality of stages. Each stage only takes a fraction of the execution time necessary to execute a complete instruction. Instructions enter the pipeline at the first stage, proceed to subsequent stages during each clock cycle until they reach the last stage. Ideally, in pipelined processors, a new instruction enters the execution pipeline every clock. In this way, multiple instructions are overlapped in execution at one time. Although instructions still require several clocks to execute, instruction throughput (rate at which instructions complete execution) is essentially one clock cycle. Thus ideally, in a pipelined processor, one instruction completes execution every clock cycle. It is important to note, however, that it is not until the last stage of the pipeline that the results of a given instruction are available.

FIG. 3 shows what happens when the prior art stack manipulation technique is implemented in a pipelined processor that exchanges actual data on a FXCH instruction. The instruction stream:
   FADD ST∅, ST1
   FXCH ST∅, ST2
   FST cannot be overlapped in execution and a top of stack bottleneck develops. The FADD instruction begins its execution during clock 1 and finishes execution and reports its result to the ST∅ register during clock 5. It is not until clock 5 that the result of the FADD instruction is available in the ST∅ register. Since the ST∅ register does not have the result until clock 5, the processor cannot begin to execute the FXCH instruction until the ST∅ register has a value which it can exchange with the ST2 register. As such the FXCH instruction cannot begin execution at clock 2, as is intended in pipeline processors, but must stall until clock 6 which is when the ST∅ register has the result of the FADD. Stalling the FXCH instruction decreases instruction throughput dramatically. In fact, the advantages of pipelining the execution unit are lost when the prior art stack manipulation technique is utilized. This is because instruction throughput gets limited by an artificial dependency created due to the multiple use of the stack top register, rather than by a true data dependency.

Thus, what is needed is a method and apparatus for stack manipulation in a processor having a pipelined execution unit wherein instruction latency due to stack manipulation is decreased and where FXCH instructions can be overlapped in execution with other instructions.

SUMMARY OF THE INVENTION

A method and apparatus for accessing and manipulating a stack register file during an instruction's execution through a pipelined execution unit. A control bus provides a plurality of control fields to the apparatus wherein the control fields each comprise control directives which provide input to the apparatus. A stack register file of eight physical registers of 86-bits each is provided for storing data. The stack register has at least two read ports and two write ports. A pointer table register file of eight 3-bit pointer table registers is provided for storing physical register addresses. The pointer table register file has at least three read ports and two write ports. The pointer table register file is coupled to the physical register file. The pointer table register provides address indirection for the stack manipulation apparatus. Three microcontrol address fields SRC1, SRC2, and DST provide directives for obtaining the addresses of an instructions source operands and the destination for the result.

A TAG register file of eight 1-bit empty/full TAG registers, one for each of the pointer registers, is provided for signalling whether the associated physical register is empty or full. The TAG register file has at least three read ports and two write ports.

A TOS address generating means generates an address of one of said pointer registers which contains an address of one of the physical registers which is the current top of stack register. The TOS address generating means is coupled to the control bus which has a 2-bit field, FTOS, for providing a 2-bit control directive for updating the TOS value.

A pointer table address generating means generates for each of the instruction operands, an address of one of the pointer registers which contains the address of one of the physical registers which contains the operand. The pointer address generating means also generates for the result of the instruction an address of one of the pointer registers which contains an address of one of the physical registers where the result is to be written. The pointer table address generating means is coupled to the control means which provides source and destination offset indexes in the SRC1, SRC2 and DST fields, respectively. The pointer table address generating means is also coupled to the pointer register files and to the TOS address generating means.

TAG checking and setting means is provided for reading the TAG register file and for writing into the TAG register file. The TAG checking and setting means is coupled to the control bus which provides the checking and setting means with two control fields, FCHK for checking the TAG register file, and FSET for setting the TAG register file.

A goal of the present invention is to provide a stack manipulation apparatus and method of operation which is compatible with a pipelined micro-architecture.

Another goal of the present invention is to reduce stack manipulation latency so that instruction execution latency is reduced to what it would be had there been no stack organization required in the architecture.

Another goal of the present invention is to provide control fields and apparatus that allows a straight forward embedding of the stack operations in a microvector.

Still yet another goal of the present invention is to provide a stack manipulation technique which allows an FXCH instruction to be overlapped in execution with other instructions.

DETAILED DESCRIPTION OF THE PRESENT INVENTION

The present invention discloses a novel method and apparatus for manipulating a stack data register file in a processor having a pipelined processor execution unit. In the following description, numerous specific details are set forth in order to provide a thorough understanding of the present invention. However, it will be obvious to one skilled in the art that the present invention may be practiced without these specific details. In other instances, well-known microprocessor concepts have not been set forth in detail in order to avoid unnecessarily obscuring the present invention.

Figure 4:
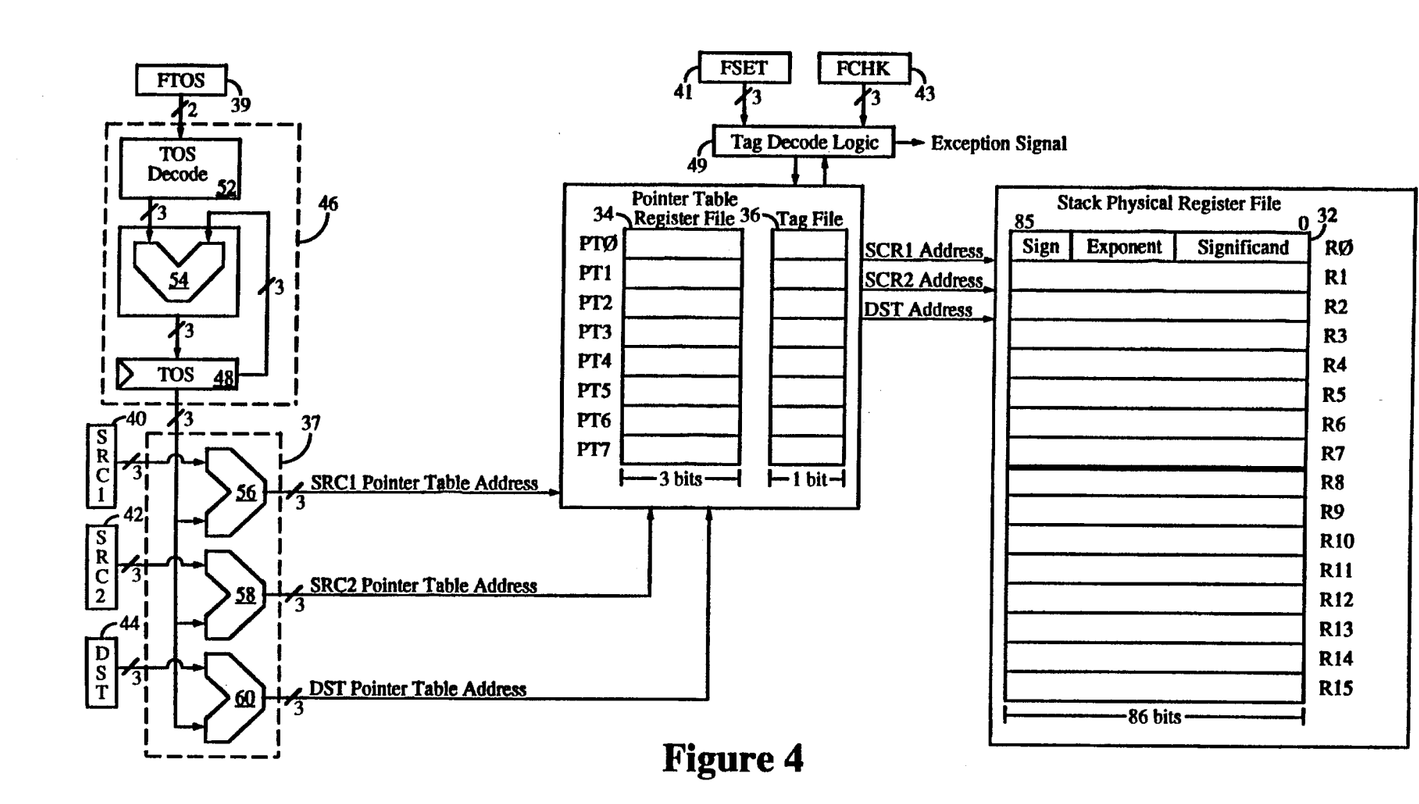
FIG. 4 is an illustration of the stack manipulation apparatus of the present invention.

The apparatus of the present invention is illustrated in FIG. 4. A stack physical register file 32 is coupled to a pointer table register file 34. Coupled to and associated with each pointer table register is a TAG register of a TAG register file 36. Coupled to the pointer table register file 34 is an address generator 37, for generating addresses of the pointer register file. The address generator is coupled to a control bus which provides source and destination indexes in three fields SRC1 40, SRC2 42, and DST 44 to the address generator. The address generator 37 is also coupled to a TOS generator 46 which provides an updated TOS or top of stack address. Coupled to said TAG register file 36 is a decoder 49 for reading and writing into the TAG register file 36. The reading and writing or checking and setting of the TAG register file is controlled by microcontrol fields FSET 41 and FCHK 43 of an instruction microcontrol vector supplied by control bus 38.

The stack physical register file comprises 16 physical registers of 86-bits each. The top eight registers (RØ–R7) are the stack registers. There are at least two read ports and two write ports in the stack register file. The 86-bit wide registers are divided into fields corresponding to the extended precision real data type. The top eight registers can be accessed only as a stack. A 3-bit value TOS 48 contained in register 47 identifies the current top of stack register. A "push" operation decrements TOS by one and loads a value into the new top register. A "pop" operation removes the value from the current top register and then increments TOS by one. The register stack grows down towards lowered address registers. Instructions may address the data registers either implicitly or explicitly. Many instructions operate on the register at the top of the stack. These instructions implicitly address the register at which TOS points. Other instructions allow the programmer to explicitly specify which register to use. This explicit register addressing is also relative to top.

The pointer table register file 34 consists of eight (PTØ–PT7) 3-bit registers. Each pointer table register stores an address of one of the eight stack physical registers. Each pointer table register is said to "point" to one of the stack physical registers. Each stack physical register address is always stored in one and in only one pointer register. Upon initialization of the pointer table register file, the PT0 register contains the address of the R0 (000) register. The PT1 register contains the address (001) of the R1 register, the PT2 register contains the address (010) of the R2 register and so on. The pointer table register file 34 has three read ports and two write ports. The pointer register file 34 provides indirection which helps to alleviate the top of stack bottleneck described earlier.

The TAG register file 36 is a set of one bit tags that reside next to the pointer table registers. The Tag register file 36 has two read ports and two write ports. The individual tag registers of the TAG register file 36 indicate whether the associated stack physical register is empty or full. The one bit empty/full tag registers of the TAG register file 36 are used to derive a 16-bit processor Tag Word of the x87 architecture. The 16-bit processor Tag Word is stored elsewhere and is computed only when the processor state is to be stored to memory. The 16-bit processor Tag Word is generated by examining the empty/full tags of the Tag register file 36 in conjunction with the values stored in the stack register files.

The 16-bit processor Tag Word marks the content of each numeric data register. Each 2-bit tag of the 16-bit processor Tag Word represents one of the eight RØ–R7, 80-bit stack physical registers. The principal function of the Tag Word is to optimize performance and stack handling by making it possible to distinguish between empty and non empty register locations. It also enables exception handlers to identify special values, e.g., nans or denormals, in the contents of a stack location without the need to perform complex decoding of the actual data. A TAG value of (00) means the data is valid. A TAG value of (01) means the data is zero. A TAG value of (10) means qnan, snan, ∞, denormal, and unsupported formats. A TAG value of (11) means the register is empty. Although each empty/full tag of the TAG register file 36 represents one of the eight physical registers RØ–R8, the TAG register file 36 is kept with the pointer table register file 34 to avoid a level of indirection when checking and setting TAGs.

The x87 processor architecture defines a 16-bit programmer visible Status Word that reflects the status of the processor after the completion of the most recent instruction. One field in this register holds a 3-bit value which is the register number of the register which is the Top of Stack at the completion of the most recent instruction. The TOS value 48 stored in the 3-bit register 47 is eventually used to update the Status Word on the completion of the given instruction.

Figure 5A:
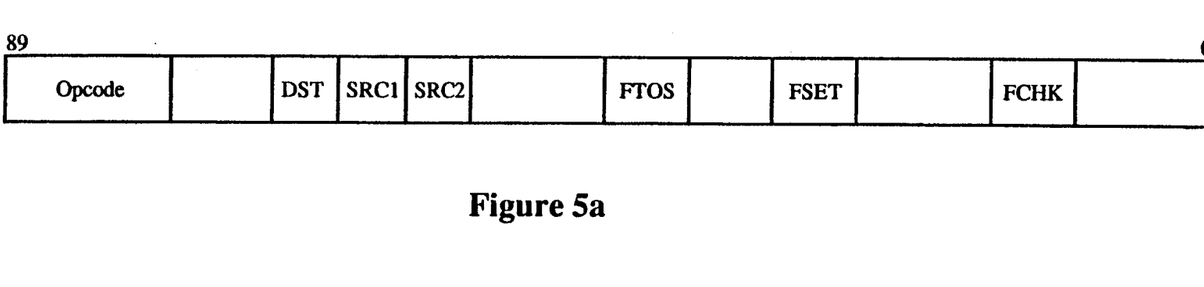
FIG. 5a is an illustration of the control fields of a μvector which are relevant to stack manipulation in the present invention.

A control bus 38 or some transport means brings microcontrol vectors or μvectors representing instructions into the apparatus. The 90-bit microcontrol vectors comprise several distinct control directive fields. In the present invention, as shown in FIG. 5a, six fields from an instruction microcontrol vector are provided to the apparatus. Three fields, SRC1 40, SRC2 42, and DST 44 are instruction operand fields, they provide 5-bit addresses for two source operands and one destination, respectively. These microcontrol fields provide indexes to the pointer address generating logic 37 when stack registers are being accessed. In the address generating logic the indexes are added to the TOS value 48 to provide addresses of pointer table registers 34 which point to the stack physical registers where the operands and destination may be found. It is to be appreciated that in the present invention a single μcontrol vector provides stack addressing for all source and destination registers of an instruction, wherein in the prior art only a single source or destination register could be addressed in a single μvector.

The other three control directive fields of a μvector provided by control bus 38 to the apparatus of the present invention are: FTOS 39, FSET 41, and FCHK 43. It is noted that in the present invention, unlike the prior art which had just one field, the STKOP field, for stack manipulation control, there are three separate microcontrol fields in each microcontrol vector, for controlling the setting and checking of TAGs and updating the TOS value 48 of register 47. In this way, each field may be executed in parallel with the other fields. Additionally, in the present invention, the FSET and FCHK fields are used to set and check the TAGs of multiple source and destination registers, and not just a single register as in the prior art. Also, while the set operation may be performed on one set of tags, the check operations may be performed on a different set of tags.

The FTOS field 39 is a 2-bit field which provides control directives for updating the TOS value 48. The FCHK field 43 of the microcontrol vector reads or checks TAG values of the pointer register table representing the source and destination registers to determine if a stack underflow or stack overflow will occur due to the present instruction. By providing a 3-bit field, eight different condition checking schemes can be provided, and in this way, all probable instruction requirements are provided for. The FSET field 41 provides a 3-bit control directive. This directive controls the setting of the source operand and destination operands TAG registers as full or empty. TAGs are only set after the FCHK directive has yielded no stack exceptions.

The present invention is implemented in a microprocessor having a pipelined micro-architecture. That is, the instruction execution unit is pipelined in order to increase instruction throughput. In processors with pipelined micro-architectures, several instructions are overlapped in execution at one time. The execution unit is divided up into several stages where each stage executes only part of the instruction. Each stage takes only a fraction of the execution time necessary to execute a complete instruction. Instructions enter the pipeline at the first stage, proceed to subsequent stages at each clock until they reach the last stage where results and errors are reported and an instruction completes its execution.

In the present invention, the pipeline is broken up into eight stages: a prefetch stage (PF), a first decode and microinstruction vector issue stage (D1), a second decode stage (D2), a memory and register file read stage (E), a first execute stage (X1), a second execute stage (X2), a rounding and floating-point write stage (WF), and an internal special situation report stage (ER). It is the D2 and E stages of the pipeline which are most relevant to the present invention.

Instruction latency is the sum of latency due to stack manipulation and latency due to pure numeric operations. It is advantageous, therefore, to reduce the latency due to stack manipulation and thereby reduce the overall latency of each instruction. In a microprocessor with a pipelined execution unit, a decrease in instruction latency translates into a decrease in the number of stages required for instruction execution.

Stack manipulation in the present invention fits into already existing and required pipelined stages of the execution pipeline, thereby essentially making the latency due to stack manipulation in the present invention equal to zero. That is, all steps necessary for manipulating the stack data registers files 32, such as generating addresses, setting and checking tags, and updating the TOS value all proceed in the D2 and E stages of the execution pipeline. The D2 stage provides a second decode and address generation and E stage provides memory and register reads. These stages are required for instruction execution even when a stack organization of data registers is not used. Thus, no additional cycles of latency are incurred due to stack manipulation in the present invention and the total instruction latency is simply the latency that would be seen without a stack organization.

Figure 5B:
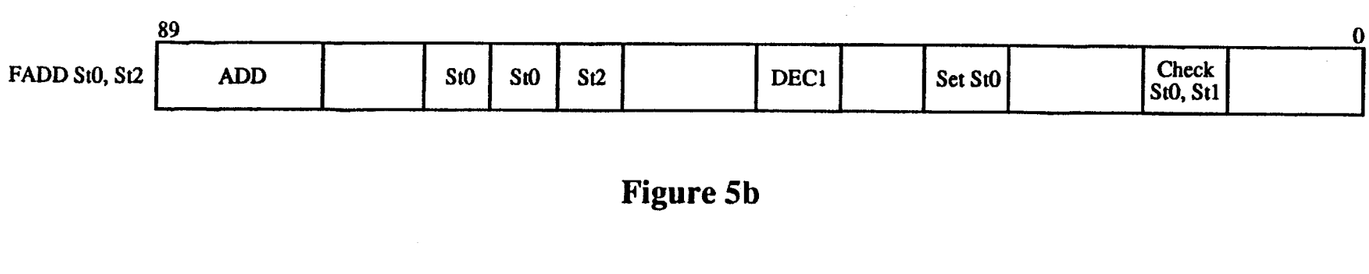
FIG. 5b is an illustration of how an instruction is represented in a μvector in the present invention.
Figure 5C:
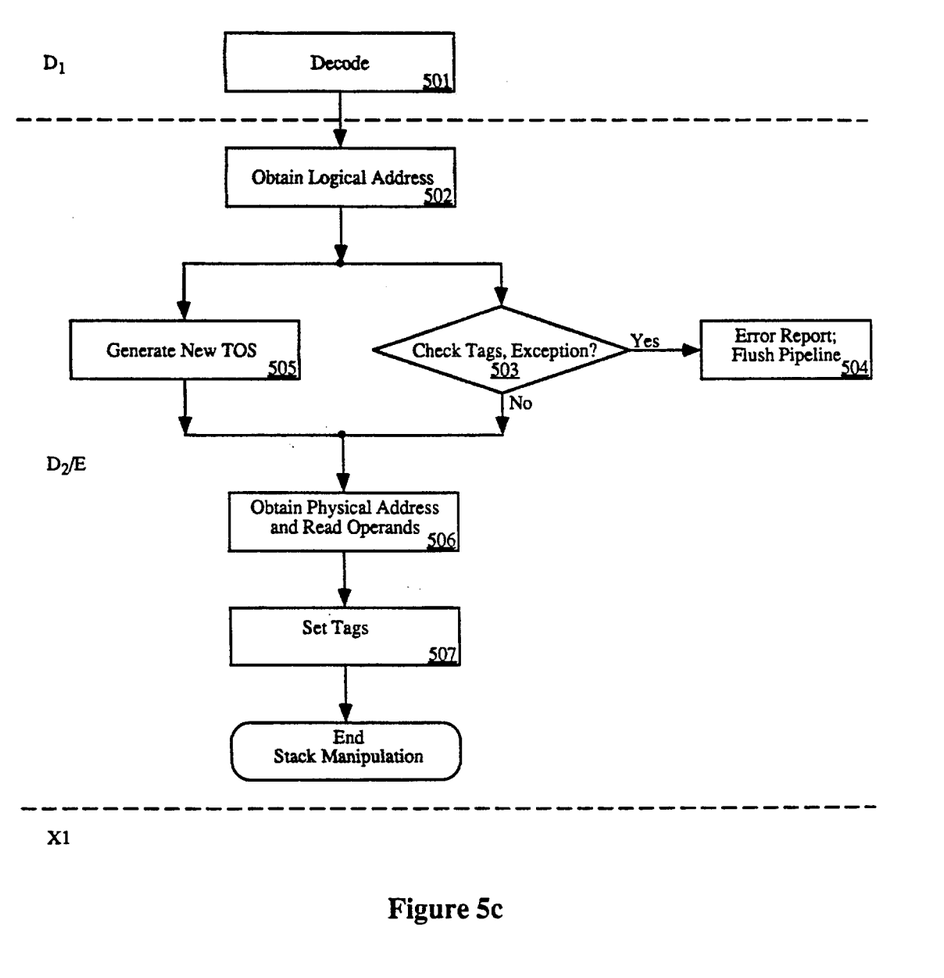
FIG. 5c is an illustration representing the flow of the present invention.

FIG. 5c details the stack manipulation procedure of the present invention and shows how the stack manipulation fits into already existing stages of the execution pipeline. In reference to block 501, in the D1 stage, a first instruction is decoded into a 90-bit microcontrol vector or a stream of 90-bit microcontrol vectors. Most basic instructions, such as FADD, FMUL and FLD are represented by a single 90-bit microcontrol vector. Each 90-bit microcontrol vector is divided up into several individual control directive fields. As shown in FIG. 5a, the present invention provides a microcontrol vector with six fields relevant to stack manipulation: the SRC1 field, SRC2 field, the DST field, all of 5-bits each, a 2-bit FTOS field, an FCHK field and an FSET field each of 3-bits. FIG. 5b shows how an instruction such as FADD STØ, ST2 is represented in a μvector.

The 90-bit microcontrol vector next enters the D2/E stage of the execution pipeline on the next clock. In block 502, the SRC1 40, SRC2 42, and DST 44 fields are each read by the address generating logic. When these fields are accessing stack physical registers, the lower 3-bits each of the SRC1 40, SRC2 42, and DST 44 fields provide an index or offset for addressing one of the eight pointer table registers, (PTØ–PT7). The TOS value 48 provides a base address (000–111) which is the address of the pointer table register which is currently the top of the stack register, STØ. Each field's 3-bit index or offset is added to the TOS value in the address generating logic 37 to provide respective pointer table addresses. Each of the addressed pointer table registers is then read to determine which of the eight physical registers each of the respective addressed pointer table register is pointing to. It is noted that at least three read ports are provided in the pointer register file so that the contents of three addressed pointer table registers may be read at any one time.

Next, in block 503 and also in the D2/E stage, the contents of specific physical registers pointed to by the addressed pointer table register is checked to see if they contain values which are expected. The contents of the physical registers are checked by reading the corresponding TAG register of the pointer table registers addressed. It is noted that in the present invention the TAGs are associated with the pointer registers and not the physical registers. This saves time by avoiding indirection in TAG reading. The TAG registers are read under control of the FCHK field 43 of the microcontrol vector. That is, the FCHK field 43 specifies which of the TAG registers should be checked. The 3-bit FCHK directive is interpreted as "check the condition indicated, and if the condition is false signal the exception described." Exceptions are signalled in block 504. The eight condition checking scenarios of the present invention are shown in Table 1.

TABLE 1

| FCHK DIRECTIVE | DEFINITION |
|---|---|
| 000 | Corresponds to a default; Do nothing |
| 001 | Check to see if DST is empty, if not signal stack overflow |
| 011 | Check SRC1 to see if it is full, if not signal stack underflow |
| 100 | Check SRC2 to see if it is full, if not signal stack underflow |
| 101 | Check to see if SRC2 is full and if DST is empty, if not signal stack underflow for SRC2 and stack overflow for DST |
| 110 | Check to see if SRC1 is empty and SRC2 is full, if not signal stack underflow for SRC2 and stack overflow for SRC1 |
| 111 | Check if SRC1 is full and SRC2 is full and if not, signal stack underflow for SRC1 or SRC2 |

It is noted that for each instruction, the physical registers pertaining to the instructions operands and destination may each be checked with a single FCHK control directive. In this way, operand and destination register may be checked in parallel during a single clock and a single stage of the instruction execution pipeline. In the prior art, a separate microcontrol vector was required for checking the TAG register of each operand and destination register. It is to be appreciated that the novel grouping of the register checking allows all 80×87 instruction TAG checking requirements to be satisfied with a single 3-bit field. Fewer bits in the FCHK field corresponds to fewer bits in each µvector, which translates into a cost savings.

In reference to block 505, in the D2/E stage, and while the operand and/or destination register tags are being checked, the TOS value 48 is updated in the TOS address generating logic 46. Decode logic 52 receives a 2-bit directive from the FTOS field 39 of the microcontrol vector. The 2-bit field is decoded into a +2, +1, 0, or −1 which is supplied to one input of a two input adder 54. At the second input is the present TOS or address of the pointer table register which is currently the top of stack register. The two inputs are added together to provide the address of the new pointer register which contains the address of the new top of stack register. It is noted that once the TOS value has reached 0 or 000, it folds around to 7 or 111. The stack grows towards lower order addresses. In the prior art the TOS updating control directives were provided in the STKOP field along with a particular address check and set directive. In the present invention a specific 2-bit control field FTOS 39 is provided in the microcontrol vector for updating the TOS value 48.

In block 506 or in the D2/E stage of the pipeline, the stack physical register addresses of the instruction operands are obtained and the contents of these registers read. Each pointer table register addressed by the address generating logic contains a 3-bit address, (000–111), which corresponds to one of the eight (R0–R7) physical stack registers. These addresses are supplied to the physical register file so that the source operands may be read. The physical register file has at least two read ports so that the operand values stored in the physical registers may be read simultaneously. Additionally, the physical register file has two write ports so that two values may be written into the stack simultaneously. In the prior art only a single read port and a single write port were provided in the physical register file.

In block 507 and also in the D2/E stage, but after operand reading, TAGs are set under control of a 3-bit FSET field 41 in the microcontrol vector. The TAG setting is performed only after the check TAG directive has yielded no stack exceptions. The different control directives of the FSET field are detailed in Table 2. Again, the present invention provides for the setting of multiple TAGs in a single µcontrol vector, wherein only a single TAG could be set in the prior art apparatus.

TABLE 2

| FSET DIRECTIVE | DEFINITION |
|---|---|
| 000 | Default; Do nothing |
| 001 | Set SRC1 as empty |
| 010 | Set SRC2 as full |
| 011 | Set SRC1 as full |
| 100 | Set SRC2 as empty |
| 101 | Set SRC1 as empty and SRC2 as empty |
| 110 | Set DST as full |
| 111 | Set DST as full and SRC2 as empty |

The 3-bit control directive is decoded by logic 49 to specify which of the eight setting scenarios is to take place. The novel TAG setting scenarios of the present invention allow TAG setting requirements of all 80×87 instructions to be provided for in a single 3-bit field. In fact most any two operand instruction's TAG setting requirements can be satisfied with the above scenarios. As is evident, the TAG register file must have at least two write ports in order to carryout the prespecified functions. After setting the specified TAGs, the stack manipulation operations for an instruction are complete.

Thus, in the present invention, six microcontrol fields in a single microcontrol vector supply all control directives necessary for stack manipulation for an instruction. Unlike the prior art, instructions having multiple operands do not require multiple µvectors in order to implement the required stack manipulation operations. Additionally, all stack manipulation occurs in the already existing and necessary D2 and E stages of the execution pipeline. Thus, no additional latency or execution time is required for stack manipulation in the present invention. Since the paralled hardware is embedded in existing stages of the pipeline, no extra pipeline stages are required for stack manipulation, and so instruction execution is extremely efficient and independent of stack manipulation operations.

Not only is the stack manipulation latency of an instruction decreased to zero in the present invention, but also the address indirection provided by the pointer table register file 34 of the present invention eliminates the top of stack bottleneck which occurs when the prior art scheme is implemented in a pipelined processor. An example is provided below to illustrate this advantage of the present invention.

As mentioned earlier, results of a given instruction are not available until the instruction reaches the ER stage of the execution pipeline. The pointer table register file essentially makes it possible to exchange stack locations for data before instructions reach the final stage of the execution pipeline. The indirection makes it possible for a programmer to overlap in execution the FXCH instruction with earlier instructions. This is essential for microprocessors which have stack organized data registers and pipelined execution units.

Figure 6:
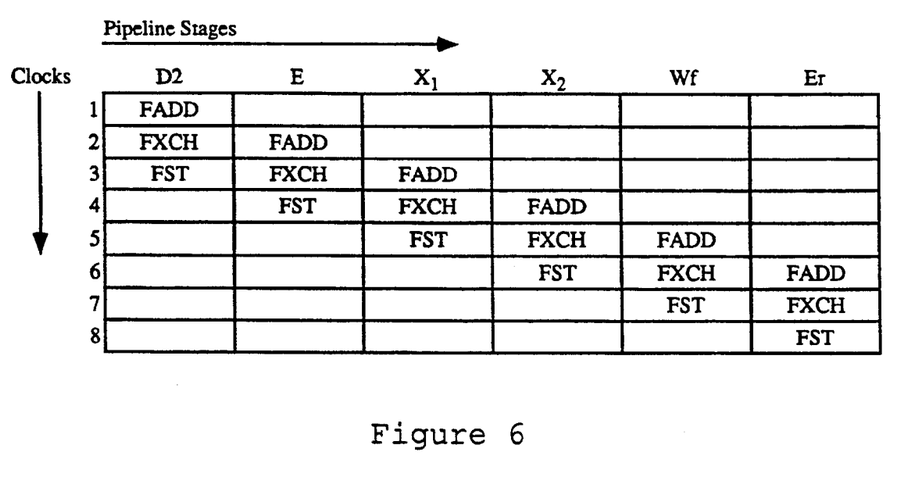
FIG. 6 is an illustration of the results of the present invention's stack manipulation scheme implemented in a pipelined processor.

For example, the present invention, as shown in FIG. 6, can, unlike the prior art, overlap the following the instruction stream

FADD ST∅, ST1
FXCH ST∅, ST2

FST in execution and relieve the top of stack bottleneck. That is, the FADD instruction begins at clock 1 and the FXCH instruction can begin at clock 2 without having to stall for the results of the FADD instruction. In this way, instruction throughput for a pipelined microprocessor implementing the present invention is one clock cycle even with FXCH instructions.

Figure 7A:
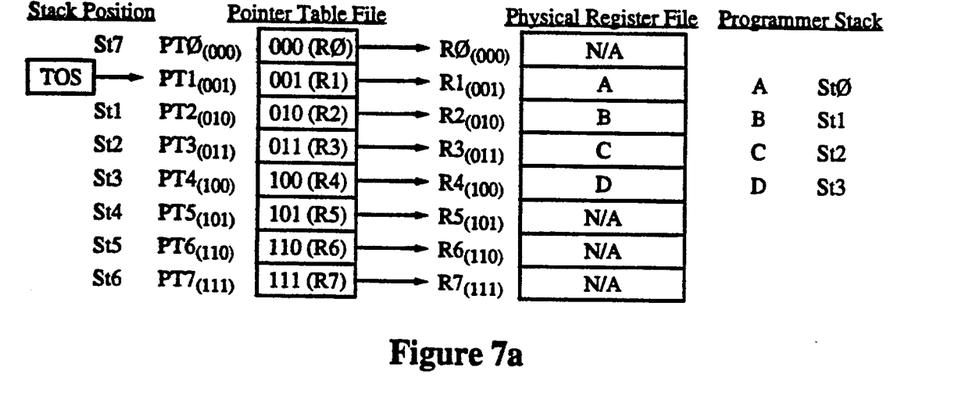
FIGS. 7a–7c are illustrations of an example of how the present invention provides indirection to alleviate the top of stack bottleneck.

As shown in FIG. 7a, a programmer will have a stack of data, for example, A, B, C and D with A being the data at the top of stack SØ, B being data in the stack position first from the top, ST1, C being data in the stack position second from the top, ST2. When the FADD instruction enters the D2 stage of the pipeline, the pointer table register file 34, the stack physical register file 32, and the TOS value 48 may contain data as illustrated in FIG. 7a. In FIG. 7a, register 47 contains a TOS value of (001) which is the address of the pointer table register (PT1) which contains the address (001) of the data register R1 which contains data A which is currently at the the top of stack, STØ. The next higher order pointer table register, PT2, in this case is the ST1 register. It contains the address (010) of data register R2 which contains data B which is currently in the position one from top of stack, ST1.

The FADD STØ, ST1 instruction, by definition, adds the data A in STØ to the data B in ST1, and returns the results of the ADD into STØ. The results of the addition, however, will not be available until the FADD instruction reaches the ER stage of the execution pipeline or until three clocks after the start of its execution in the E stage. The pointer table register file 34 of the present invention provides indirection whereby stack positions may be switched prior to receiving the results of previous instructions. Therefore, the FXCH instruction may enter the execution pipeline before the results of the FADD instruction are known. In this way, the FXCH instruction can be overlapped in execution with the FADD instruction.

Figure 7B:
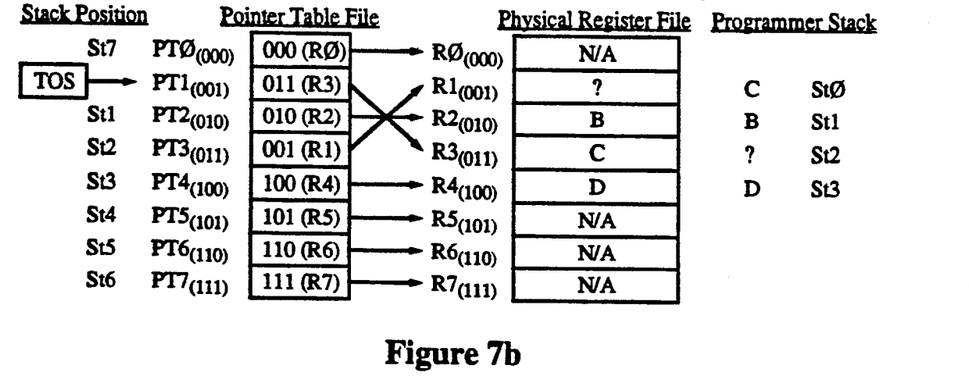

In reference to FIG. 7b, the stack positions of data C and unknown result (?) of the FADD instruction are exchanged so that data C may reach the top of stack register, STØ, from where it can be stored to memory. In order to implement the stack position exchange, the physical register address (001) stored in PT1 is exchanged with the physical register address 011 stored in PT3. In this way, PT1 "points to" physical register R3 and PT3 points to physical register R1.

The new stack positions are as shown in FIG. 7b. Data C is now in the top of stack location STØ, and the unknown result (?) of the FADD instruction is now in the second from top location (ST2). When the result of the FADD instruction is finally available, it is written into the R1 data register, which is now in the ST2 position instead of the STØ position due to the FXCH instruction. It is important to note that once an instruction is given a physical register to which to write its results, it writes to that physical register location even if that physical register is in a new stack location when the result is available.

Figure 7C:
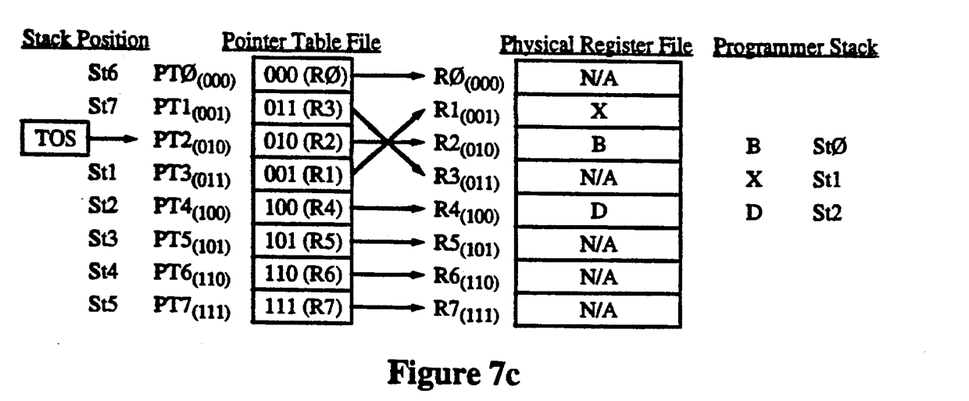

The data C can now be stored into memory because it resides in the top of stack location STØ. It is said that data C is "popped" off the stack. As shown in FIG. 7c, the store instruction stores to memory the operand C which is currently in the STØ register and updates the TOS value 48 so that it contains the address (010) of the pointer register PT2 which contains the address (010) of the data register R2 which contains data B which is the new top of stack. As such, the new programmer stack is B, X, D with B the new top of stack.

As such, the pointer table register file of the present invention provides indirection so that stack locations may be exchanged before results are available. It is noted that the exchange requires only three bits of data to be transferred because physical register addresses are being switched and not actual data. In the prior art full 80-bit strings of data were exchanged on the FXCH instruction. Exchanging three bits of data is significantly cheaper and faster than switching 80-bits of data. More importantly, however, in the present invention by switching addresses instead of data, one need not wait for the results of previous instructions to be written to physical registers before exchanges can be made. In the present invention the FXCH instruction can be overlapped in a pipelined execution unit with other instructions, and thereby alleviate the top of stack bottleneck.

Thus, a novel method and apparatus for the manipulation of a stack organized physical register file in a pipelined microprocessor has been described. The novel method an apparatus has a stack manipulation latency of zero, and allows for an FXCH instruction to be overlapped in execution.

I claim:

1. In a digital computer having a pipelined execution unit for executing instructions wherein data is organized in a stack format, an apparatus for accessing and manipulating a stack of data during the execution of an instruction through the pipelined execution unit comprising:

means for providing a plurality of control fields to said apparatus, said control fields comprising control directives to said apparatus;

a physical register file comprising a plurality of physical registers for storing said stack of data wherein said data is addressed by its respective position in said stack;

a pointer register file, comprising a plurality of pointer registers for storing addresses of said physical registers and for providing indirection for the stack manipulation apparatus wherein there is a pointer register for each of said physical registers which store data in said stack of data, said pointer register file couple to said physical register file;

a tag register file comprising a plurality of tag registers, one tag register for each of said pointer registers;

a TOS address generator generating an address of one of said pointer registers which contains the address of one of said physical registers which is the register which contains data which is at the top of the stack register, said TOS address generator coupled to said bus means;

a pointer address generator generating for each operand of said instruction the address of one of said pointer registers which contains the address of one of said physical registers which contains said operand, said pointer address generator coupled to said means, to said pointer register file and to said TOS address generator; and tag checking and setting logic reading said tag register file and writing into said tag register file, said tag checking and setting logic coupled to said means for providing said plurality of control fields and to said tag register file.

2. The apparatus of claim 1 wherein said physical register file comprises 8 physical registers of 86-bits each.

3. The apparatus of claim 1 wherein said pointer register file comprises eight 3-bit registers.

4. The apparatus of claim 1 wherein said tag register file comprises eight 1-bit registers.

5. The apparatus of claim 1 wherein said TOS address generator comprises:

a TOS register, said TOS register coupled to said pointer address generator;

an adder having a first and a second input and a first output, said output coupled to said TOS register, said first input coupled to said TOS register;

a decoder having an input coupled to said means for providing said plurality of control fields and an output coupled to said second input of said adder.

6. The apparatus of claim 1 wherein said pointer address generator comprises a plurality of two-input adders, one for each operand of said instruction, and one for the destination of said instruction.

7. The apparatus of claim 1 wherein one of said plurality control fields of said instruction is a field for controlling the generation of said TOS address.

8. The apparatus of claim 1 wherein one of said plurality of control fields is for directing the setting of said tag registers of said tag register file.

9. The apparatus of claim 1 wherein one of said plurality of control fields is for checking the contents of said tag registers of said tag register file.

10. The apparatus of claim 1 wherein said pointer register file has at least three read ports and at least two write ports.

11. The apparatus of claim 1 wherein said tag register file has at least two read ports and at least two write ports.

12. The apparatus of claim 1 wherein three control fields of said plurality of control fields are provided for addressing an instruction's operands, one field for addressing a first operand, a second field for addressing a second operand, and a third field for addressing a destination.

13. In a digital computer having a pipelined execution unit for executing instructions wherein data is organized in a stack format, an apparatus for accessing and manipulating a stack of data during the execution of an instruction through the pipelined execution unit comprising:

means for providing at the same time a plurality of control fields to said apparatus, said control fields comprising control directives for providing input signals to said apparatus, said means providing at the same time a TOS control field for controlling the updating of a top of stack register, an FSET control field for directing the setting of a TAG register of a TAG register file, and an FCHK field for controlling the reading of said TAG registers of said TAG register file;

a physical register file comprising a plurality of physical registers for storing said stack of data wherein said data is addressed by its respective position in said stack;

a pointer register file comprising a plurality of pointer registers for storing addresses of said physical registers and for providing indirection for the stack manipulation apparatus, wherein there is a pointer register for each of said physical registers which store data in said stack of data, said pointer register file coupled to said physical register file;

a TAG register file comprising a plurality of TAG registers, wherein there is a TAG register associated with each of said pointer registers, said TAG registers indicating whether or not said associated physical register contains valid data;

a TOS address generator generating an address of one of said pointer registers which contains the address of one of said physical registers which is the register which contains data which is at the top of the stack, said TOS address generator coupled to said means for providing said plurality of control fields;

pointer address generator generating for each operand of said instruction the address of one of said pointer registers which contains the address of one of said physical registers which contains said operand, and generating for the result of said instruction the address of one of said pointer registers which contains the address of one of said physical registers where the result is to be written, said pointer address generator coupled to said means for providing said plurality of control fields, to said pointer register file, and to said TOS address generator; and TAG checking and setting logic reading said TAG register file and writing into said TAG register file, said TAG checking and setting logic coupled to said means for providing said plurality of control fields and to said TAG register file.

14. The apparatus of claim 13 wherein said TOS address generator comprises:

a TOS register, said TOS register coupled to said pointer address generating means;

an adder having a first and a second input and a first output, said output coupled to said TOS register, said first input coupled to said TOS register;

a decoder having an input coupled to said bus means and an output coupled to said second input of said adder, said means for providing said plurality of control fields.

15. The apparatus of claim 13 wherein said pointer address generator comprises a plurality of two input adders, one for each operand of said instruction and one for the destination of said instruction.

16. The apparatus of claim 13 wherein said physical register file comprises eight physical registers of 86-bits each.

17. The apparatus of claim 13 wherein said pointer register file comprises eight 3-bit registers.

18. The apparatus of claim 13 wherein said TAG register file comprises eight 1-bit registers.

19. The apparatus of claim 13 wherein said pointer register file has at least three read ports and at least two write ports.

20. The apparatus of claim 13 wherein said TAG register file has at least two read ports and at least two write ports.

21. The apparatus of claim 13 wherein three control fields of said plurality of control fields are provided for addressing an instruction's operands, one field for addressing a first source operand, a second field for addressing a second source operand, and a third field for addressing a destination.

22. In a digital computer having a pipelined execution unit for executing instructions and having data arranged in a stack organization, a method of accessing and manipulating said stack of data during the execution of an instruction through the pipelined execution unit comprising the steps of:

providing a physical register file comprising a plurality of physical registers for storing said stack of data;

providing a pointer register file comprising a plurality of pointer registers for storing addresses of said physical registers and for providing indirection for the stack manipulation;

providing a TAG register file wherein there is a TAG register associated with each pointer table register;

decoding said instruction into a plurality of control fields wherein a TOS field provides directives for controlling the generation of a TOS address, a FCHK field provides directives for reading said TAG register file, and an FSET field provides directives for controlling the writing into said TAG register file, a first source field provides directives for generating the pointer table address of a first operand, a second source field provides directives for generating the pointer table address of a second instruction operand, and a first destination field provides directives for generating the pointer table address for the results of said instructions;

generating the pointer table address of said first instruction operand from said first source directive, generating the address of said second instruction operand from said second source directive and generating the address for the results of said instruction operand from said first destination directive;

checking for those instructions which require at least one of said address pointer table registers to determine if said register is empty or full, if said register is not as expected signalling an error;

reading each of said addressed pointer table registers to determine physical register addresses for each of said first and second instruction operands and the physical register address for the results of said instruction;

reading from said address physical registers of said physical register file said first and second operand;

generating under control of said TOS control directive a TOS address which is the address of a pointer table register which contains the address of a physical register which contains data which is currently the top of stack data; and setting for those instructions which require it the associated TAG of at least one of said addressed pointer registers according to said FCHK control directive.

23. The method of claim 22 wherein said stack manipulation method occurs in an address generation and in a memory and register file read stages of said execution pipeline.

24. In a digital computer having a pipelined execution unit for executing instructions wherein data is organized in a stack format, an apparatus for accessing and manipulating a stack of data during the execution of an instruction through the pipelined execution unit said apparatus comprising:

a physical register file comprising a plurality of physical registers for storing said stack of data wherein said data is addressed by its relative position in said stack;

a pointer register file, comprising a plurality of pointer registers for storing addresses of said physical registers and for providing indirection for the stack manipulation apparatus, wherein there is at least one pointer register for each of said physical registers which store data in said stack of data;

a pointer address generator generating for operands of said instruction the address of one of said pointer registers which contains the address of one of said physical registers which contains said operand.

25. The apparatus of claim 24 further comprising a TOS address generator generating an address of one of said pointer registers which contains an address of one of said physical registers which is the physical register which contains data which is at the top of said stack of data.

26. The apparatus of claim 25 further comprising a tag register file comprising a plurality of tag registers, one tag register for each of said pointer registers.

27. The apparatus of claim 25 wherein said TOS address generator comprises:

a TOS register, said TOS register coupled to said pointer address generator;

an adder having a first and a second input and a first output, said output coupled to said TOS register, said first input coupled to said TOS register;

a decoder having an input coupled to said means and an output coupled to said second input of said adder.

28. In a digital computer having a pipeline execution unit for executing instructions and having data arranged in a stack organization, a method of accessing and manipulating said stack of data during the execution of an instruction through the pipeline execution unit comprising the steps of:

storing a plurality of data as a stack of data in a physical register file comprising a plurality of physical registers wherein data in said stack of data is addressed by its relative position in said stack;

storing the addresses of said plurality of physical registers in a pointer register file comprising a plurality of pointer registers wherein each pointer register stores the address of one of said physical registers of said physical register file which contain data in said stack of data and wherein no two of said pointer registers stores the same physical register address; and generating for operands of said instruction the address of one of said pointer registers which contains the address of one of said physical registers which contains said operand.

29. The method of claim 28 further comprising the step:

generating an address of one of said pointer registers which contains an address of one of said physical registers which contains data which is at the top of said stack of data.

30. The method of claim 28 further comprising the steps of:

providing a tag register file comprising a plurality of tag registers wherein there is a tag register associated with each of said pointer registers; and reading said tag registers when the address of the associated pointer register is addressed.

* * * * *